May 11, 1971 E. LAND 3,578,540

COLOR PHOTOGRAPHIC PRODUCT FORMED BY DIFFUSION TRANSFER

Filed July 22, 1968 4 Sheets-Sheet 1

FIG. 1

INVENTOR.
EDWIN LAND
BY
BROWN AND MIKULKA
AND
ROBERT E. CORB
ATTORNEYS

INVENTOR.
EDWIN LAND
BY
BROWN AND MIKULKA
AND
ROBERT E. CORB
ATTORNEYS

INVENTOR.
EDWIN LAND
BY
BROWN AND MIKULKA
AND
ROBERT E. CORB
ATTORNEYS

United States Patent Office 3,578,540
Patented May 11, 1971

3,578,540
COLOR PHOTOGRAPHIC PRODUCT FORMED BY DIFFUSION TRANSFER
Edwin Land, Cambridge, Mass., assignor to Polaroid Corporation, Cambridge, Mass.
Continuation-in-part of application Ser. No. 622,283, Mar. 10, 1967. This application July 22, 1968, Ser. No. 746,554
Int. Cl. B44f 1/00; G03c 5/54
U.S. Cl. 161—6
8 Claims

ABSTRACT OF THE DISCLOSURE

A laminated photographic product including an image-containing layer protectively sandwiched between outer support layers and formed by utilizing an integral film unit including a photosensitvie image-recording medium and a liquid reagent for processing the recording medium following exposure thereof to produce a visible image and laminate said layers to one another to form an integral unit. The product is especially designed to resist distortion due to physical changes, particularly the quantity and distribution of moisture in laminae comprising the product.

---

This application is a continuation-in-part of the co-pending U.S. patent application of Edwin H. Land, Ser. No. 622,283, filed Mar. 10, 1967, now Pat. No. 3,415,644, dated Dec. 10, 1968.

The aforementioned application for patent discloses and claims a multilayer, composite photographic film unit adapted to be exposed and thereafter processed with an aqueous liquid reagent initially contained in the film unit to produce a visible transfer image, preferably in full color, in an image-containing layer laminated between outer layers of the film unit. Film units of this type generally include a pair of outer support layers or elements at least one of which is transparent and an intermediate layer between the outer layers composed of a plurality of laminae or strata in which an image or images are formed during exposure and processing. At least one of the laminae comprising the intermediate layer includes a photosensitive image-recording medium adapted to be exposed through the transparent outer layer and thereafter processed to produce a diffusion transfer image by an aqueous liquid reagent distributed between laminae comprising the intermediate layer, from a rupturable container originally provided as a component of the film unit, by applying compressive pressure to the film unit. The structural integrity of the film unit is retained during and following both exposure and processing so that the finished product constitutes photographic print preferably, in full color, including an image contained in the intermediate layer and visible through one of the outer support layers both of which function to support and protectively contain the image-containing layer.

As noted, the film unit is adapted to be processed by spreading a viscous aqueous liquid reagent between laminae comprising the intermediate of image-containing layer of the product thereby altering an important physical characteristic of the film unit, namely, the quantity and distribution of moisture within the layers of the unit. Moreover, the quantity and distribution of moisture will continue to change during processing (i.e., image formation) as various layers or laminae absorb and/or give up moisture, and following processing as the moisture content of the product changes with time and/or due to variations in ambient temperature and the humidity of the surrounding atmosphere. It has been discovered that such changes result in distortion, e.g., bending, buckling, wrinkling, etc., of the finished product; and it is an object of the present invention to provide a photographic image-contaning product of the type described which remains flat and planar and resists distortion due to changes in the quantity or distribution of moisture within the product.

Other objects of the invention will in part be obvious and will in part appear hereinafter.

The invention accordingly comprises the product possessing the features, properties and the relation of components exemplified in the following detailed disclosure, and the scope of the application of which will be indicated in the claims.

For a fuller understanding of the nature and objects of the invention, reference should be had to the following detailed description taken in connection with the accompanying drawings wherein:

FIGS. 2, 4 and 6 are diagrammatic, sectional views of the film unit of FIG. 1, taken along line 2—2 of FIG. 1, illustrating the arrangement of elements during three illustrated stages of the performance of a diffusion transfer process, for the production of a product in the form of a photographic print including a multicolor transfer image, the thickness of the various materials being exaggerated, and wherein FIG. 2 represents an exposure stage, FIG. 4 represents a processing stage and FIG. 6 represents a product of the process; and FIGS. 3, 5 and 7 are diagrammatic, sectional views of the film unit of FIGS. 2, 4 and 6, taken substantially along lines 3—3, 5—5 and 7—7 thereof respectively, illustrating the arrangement of layers comprising the photosensitive laminate during the three aforementioned stages of the transfer process.

As disclosed in U.S. Pat. No. 2,983,606, issued May 9, 1961, a photosensitive element containing a dye developer, that is, a dye which is a silver halide developing agent, and a silver halide emulsion may be exposed and wetted by a liquid processing composition in the dark, and the exposed photosensitive element is superposed prior to, during, or after wetting, with a sheetlike support element which preferably serves as an image-receiving element. In a preferred embodiment, the liquid processing composition is distributed as a substantially uniform layer between the photosensitive element and an image-receiving layer superposed therewith. The liquid processing composition, distributed between and in contact with the photosensitive element and the image-receiving layer, permeates the emulsion to initiate development of the latent image contained therein. The dye developer is immobilized or precipitated in exposed areas as a consequence of the development of the latent image, at least in part due to a change in the solubility characteristics of the dye developer upon oxidation and especially as regards its solubility in alkaline solutions. Immobilization may also be due in part in a tanning effect on the emulsion by oxidized developing agent, and in part to a localized exhaustion of alkali as a result of development. In unexposed and partially exposed areas of the emulsion, the dye developer is unreacted and diffusible and thus provides an imagewise distribution of unoxidized dye developer dissolved in the liquid processing composition, as a function of the point-to-point degree of exposure of the silver halide emulsion. At least part of this imagewise distribution of unoxidized dye developer is transferred, by imbibition, to a superposed image-receiving layer or lamina, said transfer substantially excluding oxidized dye developer. The image-receiving layer receives a depthwise diffusion, from the developed emulsion, of unoxidized dye developer without appreciably disturbing the imagewise distribution thereof to provide the reversed or positive color image of the developed image. The image-receiving layer may contain agents adapted to mordant or otherwise fix the diffused, unoxidized dye developer. If the color of the transferred dye developer is affected by changes in the pH of the image-receiving layer, this pH may be adjusted in accordance with well-known techniques to provide a pH affording the desired color.

The dye developers, as noted above, are compounds which contain, in the same molecule, both the chromophoric system of a dye and also a silver halide developing function. By "a silver halide developing function" is meant a grouping adapted to develop exposed silver halide. A preferred silver halide development function is a hydroquinonyl group. Other suitable developing functions include ortho-dihydroxyphenyl and ortho- and para-amino substituted hydroxyphenyl groups. In general, the development function includes a benzenoid developing function, that is, an aromatic developing group which forms quinonoid or quinone substances when oxidized.

Multicolor images may be obtained using color image-forming components such as, for example, the previously mentioned dye developers, in diffusion transfer processes by several techniques. One such technique contemplates obtaining multicolor transfer images utilizing dye developers by employment of an integral multilayer photosensitive element, such as is disclosed in the aforementioned U.S. Pat. No. 2,983,606, and particularly with reference to FIG. 9 of the patent's drawing, wherein at least two selectively sensitized photosensitive strata, superposed on a single support, are processed, simultaneously and without separation, with a single, common image-receiving layer. A suitable arrangement of this type comprises a support carrying a red-sensitive silver halide emulsion stratum, a green-sensitive silver halide emulsion stratum and a blue-sensitive silver halide emulsion stratum, said emulsions having associated therewith, respectively, for example, a cyan dye developer, a magneta dye developer and a yellow dye developer. The dye developer may be utilized in the silver halide emulsion layer, for example, in the form of particles, or it may be employed as a layer behind the appropriate silver halide emulsion strata. Each set of silver halide emulsion and associated dye developer strata are disclosed to be optionally separated from other sets of suitable interlayers, for example, by a layer of gelatin or polyvinyl alcohol. In certain instances, it may be desirable to incorporate a yellow filter in front of the green-sensitive emulsion and such yellow filter may be incorporated in an interlayer. However, where desirable, a yellow dye developer of the appropriate spectral characteristics and present in a state capable of functioning as a yellow filter may be employed. In such instances, a separate yellow filter may be omitted.

The dye developers are preferably selected for their ability to provide colors that are useful in carrying out subtractive color photography, that is, the previously mentioned cyan, magenta and yellow. The dye developers employed may be incorporated in the respective silver halide emulsion or, in the preferred embodiment, in a separate layer behind the respective silver halide emulsion. Specifically, the dye developer may, for example, be in a coating or layer behind the respective silver halide emulsion and such a layer of dye developer may be applied by use of a coating solution containing about 0.5 to 8%, by weight, of the respective dye developer distributed in a film-forming natural, or synthetic, polymer, for example, gelatin, polyvinyl alcohol, and the like, adapted to be permeated by a particular diffusion transfer fluid processing composition.

As disclosed in my copending U.S. application Ser. No. 234,864, now Pat. No. 3,362,819, dated Jan. 9, 1968, image-receiving elements, particularly adapted for employment in diffusion transfer processes of the type disclosed in aforementioned U.S. Pat. No. 2,983,606, wherein the image-receiving elements are separated from contact with a superposed photosensitive element, subsequent to substantial transfer image formation, preferably comprise a support layer possessing on one surface thereof, in sequence, a polymeric acid layer and an image-receiving layer adapted to provide a visible image upon transfer to said layer of diffusible dye image-forming substance, and most preferably include an inert timing or spacer layer intermediate the polymeric acid layer and the image-receiving layer.

As set forth in my last-mentioned application, the polymeric acid layer comprises polymers which contain acid groups, such as carboxylic acid and sulfonic acid groups, which are capable of forming salts with alkali metals, such as sodium potassium, etc., or with organic bases, particularly quaternary ammonium bases, such as tetramethyl ammonium hydroxide, or potentially acid-yielding groups, such as anhydrides or lactones, or other groups which are capable of reacting with bases to capture and retain them. The acid-reacting group is, of course, nondiffusible from the acid polymer layer. In the preferred embodiments disclosed, the acid polymer contains free carboxyl groups and the transfer processing composition employed contains a large concentration of sodium and/or potassium ions. The acid polymers stated to be most useful are characterized by containing free carboxyl groups, being insoluble in water in the free acid form, and by forming water-soluble sodium and/or potassium salts.

The acid polymer layer is disclosed to contain at least sufficient acid groups to effect a reduction in the pH of the image layer from a pH of about 13 to 14 to a pH of at least 11 or lower at the end of the imbibition period, and preferably to a pH of about 5 to 8 within a short time after imbibition. As previously noted, the pH of the processing composition preferably is of the order of at least 13 to 14.

It is, of course, necessary that the action of the polymeric acid be so controlled as not to interfere with either development of the negative or image transfer of unoxidized dye developers. For this reason, the pH of the image layer is kept at a level of pH 12 to 14 until the dye image has been formed after which the pH is reduced very rapidly to at least about pH 11, and preferably about pH 9 to 10, before the transfer image is separated and exposed to air. Unoxidized dye developers containing hydroquinonyl developing radicals diffuse from the negative to the positive as the sodium or other alkali salt. The diffusion rate of such dye image-forming components thus is at least partly a function of the alkali concentration, and it is necessary that the pH of the image layer remain on the order of 12 to 14 until transfer of the necessary quantity of dye has been accomplished. The subsequent pH reduction, in addition to its desirable effect upon image light stability, serves a highly valuable photographic function by substantially terminating further dye transfer. The processing technique thus effectively minimizes changes in color balance as a result of longer imbibition times in multicolor transfer processes using multilayer negatives.

The inert spacer layer of the aforementioned copending application, for example, an inert spacer layer comprising polyvinyl alcohol or gelatin, acts to "time" control the pH reduction by the polymeric acid layer. This timing is disclosed to be a function of the rate at which the alkali diffuses through the inert spacer layer. It was stated to have been found that the pH does not drop until the alkali has passed through the spacer layer, i.e., the pH is not reduced to any significant extent by the mere diffusion into the interlayer, but the pH drops quite rapidly once the alkali diffuses through the spacer layer.

As examples of materials for use as the image-receiving layer or lamina, mention may be made of solution dyeable polymers such as nylons as, for example, N-methoxymethyl polyhexamethylene adipamide; partially hydrolyzed polyvinyl acetate; polyvinyl alcohol with or without plasticizers; cellulose acetate with filler as, for example, one-half cellulose acetate and one-half oleic acid; gelatin; and other materials of a similar nature. Preferred materials comprise polyvinyl alcohol or gelatin containing a dye mordant such as poly-4-vinylpyridine, as disclosed in U.S. Pat. No. 3,148,061, issued Sept. 8, 1964.

As disclosed in the previously cited patents, the liquid processing composition referred to for effecting multicolor diffusion transfer processes comprises at least an aqueous solution of an alkaline material, for example, diethylamine, sodium hydroxide or sodium carbonate and the like, and preferably possessing a pH in excess of 12, and most preferably include a viscosity-increasing compound constituting a film-forming material of the type which, when the composition is spread and dried, forms a relatively firm and relatively stable film. The preferred film-forming materials disclosed comprise high molecular weight polymers such as polymeric, water-soluble ethers which are inert to an alkaline solution such as, for example, a hydroxyethyl cellulose or sodium carboxymethyl cellulose. Additionally, film-forming materials or thickening agents whose ability to increase viscosity is substantially unaffected if left in solution for a long period of time are also disclosed to be capable of utilization. As stated, the film-forming material is preferably contained in the processing composition in such suitable quantities as to impart to the composition a viscosity in excess of 100 c.p.s. at a temperature of approximately 24° C. and preferably in the order of 100,000 c.p.s. to 200,000 c.p.s. at that temperature.

In accordance with aforementioned U.S. Pat. No. 2,983,606, an image-receiving layer of the type disclosed in that patent need not be separated from its superposed contact with the photosensitive element, subsequent to transfer image formation, if the image-receiving element or support for the image-receiving layer is transparent and a processing composition containing a substance rendering the dried processing composition layer opaque is spread between the layer or lamina in which the image is formed and the silver halide emulsion or emulsions.

However, it has been found, if the image-receiving layer is maintained in contact with the photosensitive layer or layers, subsequent to dye developer transfer image formation, and includes the presence of an alkaline processing composition, necessarily having a pH at which dye developer, for example, in reduced form, diffuses to form the dye transfer image, intermediate the elements, the transfer image thus formed is unstable over an extended period of time. The dye image instability is due at least in part to the presence of what is, in general, a relatively high pH alkaline composition in intimate contact with the dye or dyes forming the image. This contact itself provides instability to the molecular structure of dye by, for example, catalyzing degradation and undesirable structural shifts effecting the spectral absorption characteristics of the image dye. In addition, the presence of an alkaline composition possessing a pH at which the dye, for example, in reduced form, diffuses, also provides an integral dynamic system wherein oxidized dye, immobilized in areas of the photosensitive element as a function of its development, with the passage of time attempts to generate in such areas an eqilibrium between oxidized and reduced dye. In that the pH of the dynamic system is such that diffusion of the reduced form of the dye will occur, such reduced dye will, at least in part, transfer to the image-receiving layer and the resultant diffusion will imbalance the equilibrium in such areas of the photosensitive element, in favor of additional formation of reduced dye. As a function of the efficiency of the image-receiving layer as a dye sink, such nonimagewise dyeing of the image-carrying layer still further imbalances the equilibrium in favor of the additional formation of dye in reduced, diffusble form.

As prevously discussed, my copending U.S. application Ser. No. 234,864, discloses examples of image-receiving elements particularly adapted for employment in diffusion transfer color processes wherein the image-receiving element is separated from contact with a superposed photosensitive element subsequent to substantial transfer image formation, and which elements provide particular protection of transfer images from the effects of aerial oxidation of dyes forming the color transfer image.

It has now quite unexpectedly been discovered that the problems inherent in fabricating a film unit of the type wherein the image-receiving element, the alkaline processing composition and the photosensitive element are maintained in contiguous contact subsequent to dye transfer image formation, for example, a film unit of the type described hereinbefore with reference to aforementioned U.S. Pat. No. 2,983,606, may be simply and effectively obviated by fabrication of a film unit in accordance with the physical parameters hereinafter specifically set forth.

Specifically, it has now been unexpectedly discovered that an integral photographic film unit particularly adapted for the production of a dye transfer image of unexpectedly improved stability and other properties, by a color diffusion transfer process described hereinafter, will be constructed to include a photosensitive element comprising a laminate including as essential layers or strata, in sequence, a dimensionally stable opaque support layer; a photosensitive silver halide emulsion layer having associated therewith dye image-providing material which is soluble and diffusible in alkali at a first pH; an alkaline solution permeable polymeric layer dyeable by the dye image-providing material; an alkaline solution permeable polymeric acid layer containing sufficient acidifying groups to effect reduction subsequent to substantial transfer dye image formation, of a particular processing solution having the first pH to a second pH at which said dye image-providing material is insoluble and nondiffusible; and a dimensionally stable transparent support layer. Coupled with this laminate is a rupturable container of an aqueous alkaline processing composition having the first pH and containing an opacifying agent in a quantity sufficient to mask the dye-image-providing material. The container is located adjacent an edge of the laminate in position to effect the unidirectional discharge of its contents between the alkaline solution permeable and dyeable polymeric layer or lamina and the photosensitive silver halide emulsion layer or lamina next adjacent thereto, upon application of compressive force to the container.

In a preferred embodiment of the present invention, the film unit is specifically adapted to provide for the production of a multicolor dye transfer image and the photosensitive laminate comprises, in order of essential layers or laminae, the dimensionally stable opaque support layer; at least two selectively sensitized silver halide emulsion strata or laminae each having dye image-providing materials of predetermined color associated therewith which are soluble and diffusible in alkali at a first pH; the alkaline solution permeable polymeric layer or lamina dyeable by the dye image-providing materials; the alkaline solution permeable polymeric acid lamina containing sufficient acidifying groups to effect reduction, subsequent to substantial multicolor transfer dye image formation, of a processing composition having the first pH to a second pH at which the dye image-providing material is insoluble and nondiffusible; and the dimensionally stable transparent support layer.

The silver halide emulsions comprising the multicolor photosensitive laminate preferably possess predominant spectral sensitivity to separate regions of the spectrum and each has associated therewith a dye, which is a silver halide developing agent and is preferably substantially soluble in the reduced form only at the first pH, possessing a spectral absorption range substantially complementary to the predominant sensitivity range of its associated emulsion.

In the preferred embodiment, each of the emulsion strata or laminae and its associated dye, is separated from the remaining emulsion strata or laminae and their associated dyes by separate alkaline solution permeable polymeric interlayers or laminae and the dyeable polymeric lamina is separated from the polymeric acid lamina by an alkaline solution permeable polymeric spacer lamina, most preferably a polymeric spacer lamina having decreasing permeability to alkaline solution with increasing temperature.

In such preferred embodiment of the invention, the silver halide emulsion comprises photosensitive silver halide dispersed in gelatin and is about 0.6 to 6 microns in thickness; the dye itself is dispersed in an aqueous alkaline solution polymeric binder, preferably gelatin, as a separate lamina about 1 to 7 microns in thickness; the alkaline solution permeable polymeric interlayers, preferably gelatin, are about 1 to 5 microns in thickness; the alkaline solution permeable and dyeable polymeric lamina is transparent and about 0.25 to 0.4 mil in thickness; the alkaline solution polymeric spacer lamina intermediate the dyeable polymeric lamina and the polymeric acid lamina is transparent and about 0.1 to 0.7 mil in thickness; and the alkaline solution permeable polymeric acid lamina is transparent and about 0.3 to 1.5 mils in thickness. The dimensionally stable opaque and transparent support layers are alkaline solution impermeable and are preferably of the same thickness, for example, about 2 to 6 mils. It will be specifically recognized that the relative dimensions recited above may be appropriately modified, in accordance with the desires of the operator with respect to the specific product which is to be prepared and embodies the present invention.

The image-containing, laminated product of the present invention is produced by distributing a viscous aqueous alkaline liquid in a thin layer intermediate the outer support layers of a film unit. The water tends to be absorbed to a variable extent by the laminae or layers of the structure with the result that the distribution of the liquid and the swelling of the layers may not be uniform; and moreover, the quantity and distribution of the water within the laminate will vary with time as processing and image-formation proceed to completion and following processing due, for exampe, to migration of moisture within the structure and transfer of moisture between the structure and the surrounding atmosphere as by evaporation. It has been found that prior art laminated products of this type, particularly those containing color transfer images formed according to prior art practices, tend to become deformed or distorted exhibiting bending, bowing, ripples and the like, due to differences in the permeability and swellability of the various layers and changes in the moisture content of and distribution of moisture within, the laminate.

The present invention is concerned with the discovery that distortion and deformation of the laminated, image-containing product can be prevented and the laminate made to remain flat, undistorted and ripple-free if the image-containing layer, although composed of a plurality of different strata or laminae, is considered to be a single, hydrophilic layer embodied in a symmetrical sandwich structure; and distortion does not occur if the image-containing layer is sandwiched between outer support layers that are relatively impermeable to and non-swellable by moisture, in a structure in which the boundaries of the image-containing layer are symmetrically arranged with respect to the boundaries of the laminate. For this purpose, symmetry is considered to be a function of the physical properties and characteristics of the barriers between the faces of the image-containing layer and the surrounding atmosphere. If the barriers for the image-containing layer are symmetrical, then a distortion-free product is obtained and insofar as distortion is concerned, such factors as the moisture permeability or transmission rate and swellability of the laminae which comprise the image-containing layer, or the moisture content of or distribution of moisture within, the product, can be substantially disregarded.

In the preferred embodiment of a film unit for the production of a laminated product including a multicolor transfer image according to the present invention, the respective silver halide/dye developer units of the photosensitive element will be in the form of a tripack configuration which will ordinarily comprise a cyan dye developer/red-sensitive emulsion unit contiguous the dimensionally stable opaque support layer, the yellow dye developer/blue sensitive emulsion unit most distant from the opaque support layer and the magenta dye developer/green-sensitive emulsion unit intermediate those units, recognizing that the relative order of such units may be varied in accordance with the desires of the operator.

Employment of a film unit of the general type described according to the hereinafter described color diffusion transfer photographic process, provides for the production of a finished, laminated product in the form of a print including a highly stable color transfer image protectively enclosed and requiring no additional chemical or physical treatment. The stable color transfer image is obtained in a dimensionally stable structure maintained as an integral laminate unit during exposure, processing, viewing, and storage of the unit.

Reference is now made to FIGS. 1 through 7 of the drawings wherein there is illustrated a preferred film unit adapted to be employed to produce the product of the present invention and the steps involved in the process and the finished product thereof. The film unit, designated 10, comprises rupturable container 11 of an aqueous alkaline solution 12, and a photosensitive laminate 13 including, in order, dimensionally stable, opaque support layer 14, preferably an actinic radiation-opaque flexible sheet material; a cyan dye developer strata or lamina 15; a red-sensitive sliver halide emulsion lamina 16; an interlayer 17; a magenta dye developer lamina 18; a green-sensitive sliver halide emulsion lamina 19; an interlayer 20; a yellow dye developer lamina 21; a blue-sensitive silver halide emulsion lamina 22; an auxiliary lamina 23, which may contain an auxiliary silver halide developing agent; an image-receiving lamina 24; a spacer lamina 25; a neutralizing lamina 26; and a dimensionally stable, transparent support layer 27, preferably an actinic radiation transmissive flexible sheet material.

The structural integrity of laminate 13 may be maintained, at least in part, by the adhesive capacity exhibited between the various layers or laminae comprising the laminate at their opposed surfaces. However, the adhesive capacity exhibited at an interface intermediate image-receiving lamina 24 and the silver halide emulsion lamina next adjacent thereto, for example, intermediate image-receiving lamina 24 and auxiliary lamina 23 as illustrated in FIGS. 2 through 7, should be less than that exhibited at the interface between the opposed surfaces of the remainder of the layers and laminae forming the laminate, in order to facilitate distribution of processing solution 12 intermediate the stated image-receiving lamina 24 and the silver halide emulsion lamina next adjacent thereto. The laminate's structural integrity may also be enhanced or provide, in whole or in part, by providing a binding member extending around the edges of laminate 13, and maintaining the layers comprising the laminate intact, except at the interface between laminae 23 and 24 during distribution of alkaline solution 12 intermediate those laminae. As illustrated in the drawings, the binding member may comprise a tape 28 adhered to the edges of the laminate for securing the layers of laminate 13 together at their edges. Tape 28 will also act to maintain processing solution 12 intermediate image-receiving lamina 24 and the silver halide emulsion lamina next adjacent thereto, upon application of compressive pressure to container 11 and distribution of its contents intermediate the stated laminae. Under such circumstances, binder tape 28 will act to prevent leakage of processing composition from the film laminate during and subsequent to photographic processing.

Rupturable container 11 may be of the type shown and described in any of U.S. Pats. Nos. 2,543,181; 2,634,886; 2,653,732; 2,723,051; 3,056,491; 3,056,492; 3,152,515; and the like. In general, such containers comprise a rectangular blank of fluid- and air-impervious sheet material folded longitudinally upon itself to form two walls 29 which are sealed to one another along their longitudinal and end margins to form a cavity in which processing solution 12 is retained. The longitudinal marginal seal 30 is made weaker than the end seals 31 so as to become unsealed in response to the hydraulic pressure generated within the fluid contents 12 of the container by the application of compressive pressure to walls 29 of the container.

Figure 1:
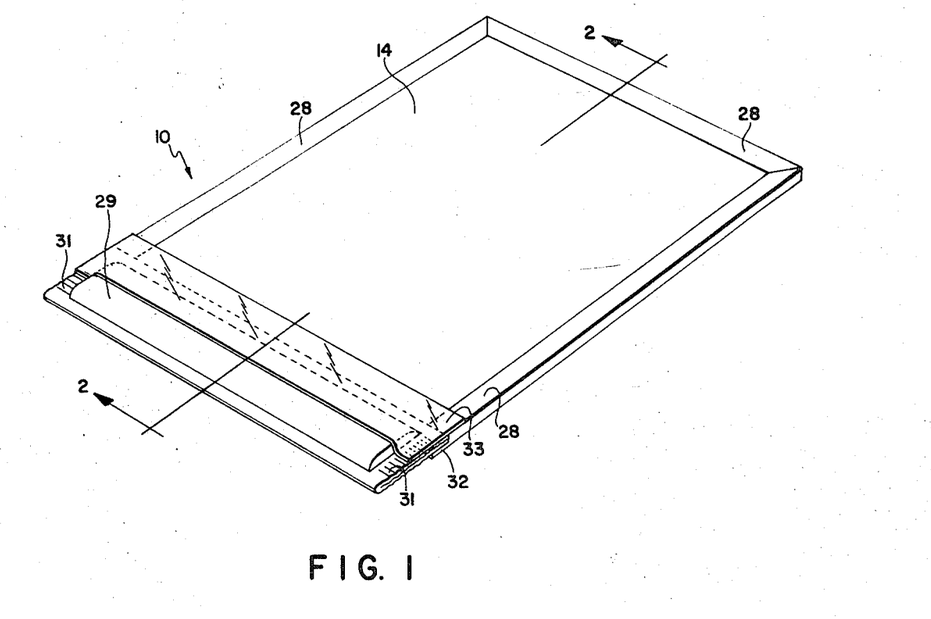
FIG. 1 is a perspective view of a photographic film unit embodying the invention.
Figure 2:
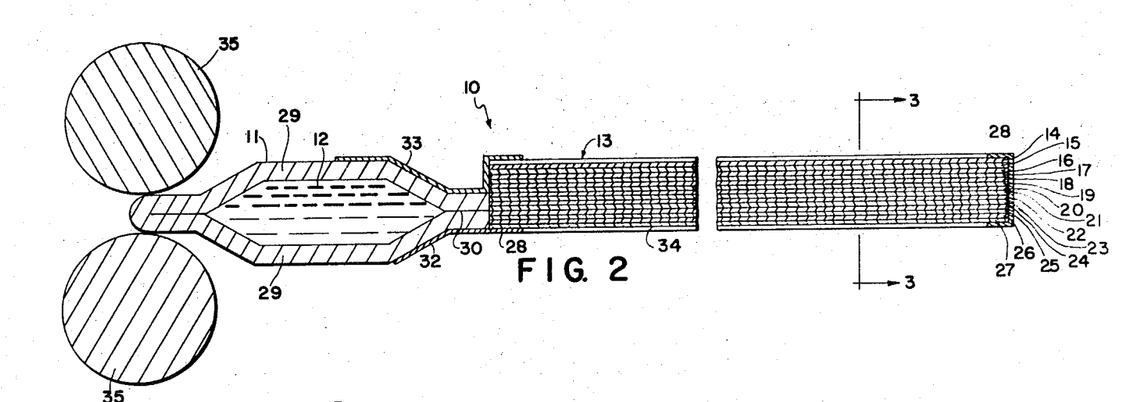
Figure 3:
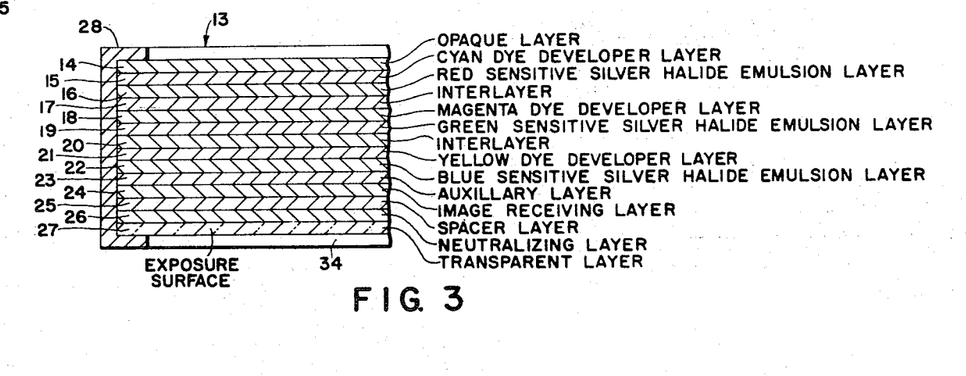
Figures 4, 5:
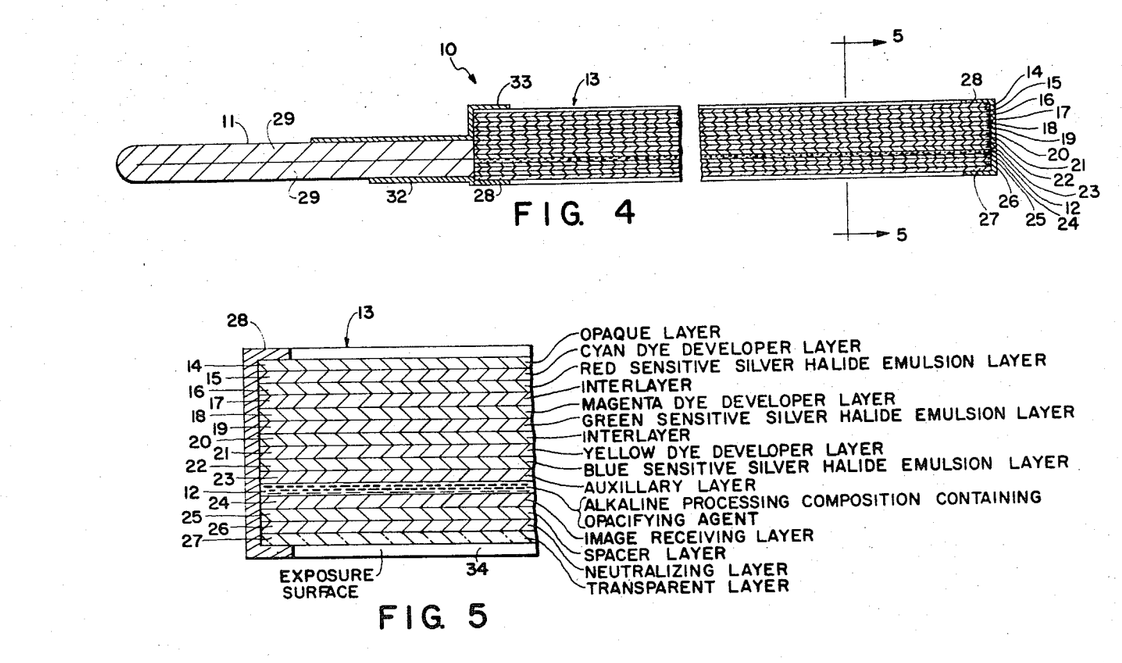
Figure 6:
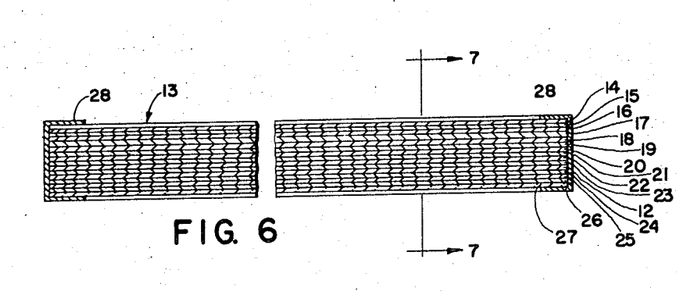
Figure 7:
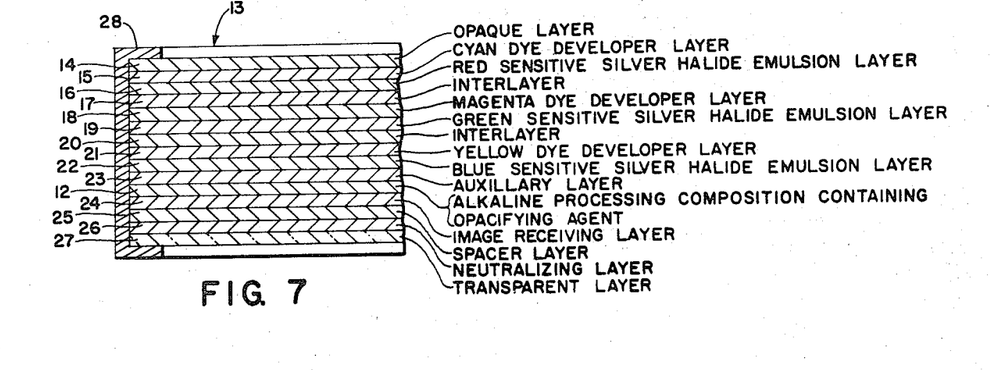

As illustrated in FIGS. 1, 2 and 4, container 11 is secured to and extends transverse an edge (called the leading edge) of photosensitive laminate 13 in position to effect unidirectional discharge of the container's contents 12 between image-receiving lamina 24 and the stated lamina next adjacent thereto, upon application of compressive force to container 11; and for this purpose, longitudinal marginal seal 30 is directed toward the interface between image-receiving lamina 24 and auxiliary lamina 23. As shown in FIGS. 1, 2 and 4, container 11 is secured to laminate 13 by extension 32 of tape 28 extending over a portion of one wall 29 of the container at least in the region of seal 30 and a separate retaining member such as a retaining tape 33 extending over a portion of the other wall 29 of the container and a portion of the surface of laminate 13.

The fluid contents of the container include an aqueous alkaline solution having a pH at which the dye developers are soluble and diffusible and contains an opacifying agent in a quantity sufficient to mask the dye developers associated with the silver halide emulsions subsequent to processing. In general, such a concentration of opacifying agent will be sufficient to prevent further exposure of the film unit's silver halide emulsion or emulsions, by actinic radiation traversing the dimensionally stable, transparent support layer subsequent to distribution of the processing solution intermediate the dyeable polymeric lamina and the stated lamina next adjacent thereto. Accordingly, the film unit may be processed, subsequent to distribution of the liquid composition, in the presence of such radiation, in view of the fact that the silver halide emulsion or emulsions of the laminate are appropriately protected by incident radiation, at one major surface by the opaque processing composition and at the remaining major surface by the dimensionally stable, opaque support layer. If the illustrated binder tapes are also opaque, edge leakage of actinic radiation incident on the emulsion or emulsions will also be prevented. The selected opacifying agent, however, should be one providing a background suitable for viewing the dye developer transfer image formed in the dyeable polymeric layer. In general, while substantially any opacifying agent may be employed, it is preferred that an opacifying agent be selected that will not interfere with the color integrity of the dye transfer image, as viewed by the observer, and, most preferably, an agent which is aesthetically pleasing to the viewer and does not provide a background noise signal degrading or detracting from the information content of the image. Particularly desirable opacifying agents will be those providing a white background for viewing the transfer image, and specifically those conventionally employed to provide background for reflection photographic prints and possessing the optical properties desired for reflection of incident radiation.

As examples of opacifying agents, mention may be made of barium sulfate, zinc oxide, titanium oxide, barium stearate, silver flake, silicates, alumina, zirconium oxide, zirconium acetyl acetate, sodium zirconium sulfate, kaolin, mica, and the like.

A particularly preferred agent comprises titanium dioxide due to its highly effective reflection properties. In general, based upon percent titanium dioxide (weight volume), a processing composition containing about 4, 10, 20, 30 and 40% titanium dioxide will provide a percent reflectance of about 58, 76, 85, 90 and 99%, respectively. In the most preferred embodiments, the percent reflectance desired will be in the order of above 85%.

Where it may be desired to increase the opacifying capacity of a processing composition containing, for example, titanium dioxide, beyond that ordinarily obtained, it may also be desirable to provide an additional opacifying agent such as carbon black, for example, added in a concentration of about 1 part carbon black to 100 to 500 parts titanium dioxide.

In the performance of a diffusion transfer multicolor process employing film unit 10, the unit is exposed to radiation actinic to photosensitive laminate 13 incident on the laminate's exposure surface 34 as illustrated in FIG. 2. Subsequent to exposure, film unit 10 is processed by being passed through juxtaposed pressure rolls 35, to apply compressive pressure to rupturable container 11 and effect rupture of longitudinal seal 30 and distribution of alkaline processing composition 12 intermediate dyeable polymeric lamina 24 and auxiliary lamina 23.

Alkaline processing solution 12 permeates emulsion laminae 16, 19 and 22 to initiate development of the latent images contained in the respective emulsions. The cyan, magenta and yellow dye developers of laminae 15, 18 and 21 are immobilized as a function of the development of their respective associated silver halide emulsions, preferably substantially as a result of their conversion from the reduced form to their relatively insoluble and non-diffusible oxidized form, thereby providing imagewise distributions of mobile, soluble and diffusible cyan, magenta and yellow dye developer, as a function of the point-to-point degree of their associated emulsions' exposure. At least part of the imagewise distributions of mobile cyan, magenta and yellow dye developer transfers, by diffusion, to aqueous alkaline solution permeable polymeric lamina 24 to provide a multicolor dye transfer image to that lamina. Subsequent to substantial transfer image formation, a sufficient portion of the ions comprising aqueous alkaline solution 12 transfer by diffusion through permeable polymeric lamina 24 and permeable spacer lamina 25 to permeable polymeric acid layer 26 wherein alkaline solution 12 decreases in pH as a function of neutralization to a pH at which the cyan, magenta, and yellow dye developers, in the reduced form, are insoluble and non-diffusible and thereby provide a stable, multicolor, dye transfer image.

The present invention will be further illustrated and detailed in conjunction with the following specific examples which set out representative embodiments and photographic utilization of the novel photographic film units of this invention, which, however, are not limited to the details therein set forth and are intended to be illustrative only.

Film units similar to that shown in the drawing may be prepared, for example, by coating, in succession, on a gelatin subbed, opaque polyethylene terephthalate film base, the following strata or laminae:

(1) A lamina of the cyan dye developer 1,4-bis-($\beta$-[hydroquinonyl - $\alpha$ - methyl] - ethyl - amino)-5,8-dihydroxy-anthraquinone dispersed in gelatin and coated at a coverage of about 150 mgs./ft.$^2$ of dye and about 200 mgs./ft.$^2$ of gelatin;

(2) A red-sensitive gelatino-silver iodobromide emulsion coated at a coverage of about 200 mgs./ft.$^2$ of silver and about 100 mgs./ft.$^2$ of gelatin;

(3) A lamina of gelatin coated at a coverage of about 200 mgs./ft.$^2$;

(4) A lamina of the magenta dye developer 2-(p-[$\beta$-hydroquinonylethyl] - phenylazo) - 4 - iso - propoxy - 1 - naphthol dispersed in gelatin and coated at a coverage of 70 mgs./ft.$^2$ of dye and about 100 mgs./ft.$^2$ of gelatin;

(5) A green-sensitive gelatino-silver iodobromide emulsion coated at a coverage of about 100 mgs./ft.$^2$ of silver and 60 mgs./ft.$^2$ of gelatin;

(6) A lamina of gelatin coated at a coverage of about 150 mgs./ft.$^2$;

(7) A lamina of the yellow dye developer 4-(p-[β-hydroquinonylethyl] - phenyllazo) - 3-(N-n-hexylcarboxamido)-1-phenyl-5-pyrazolone dispersed in gelatin and coated at a coverage of about 40 mgs./ft.$^2$ of dye and 50 mgs./ft.$^2$ of gelatin;

(8) A blue-sensitive gelatino-silver iodobromide emulsion coated at a coverage of about 60 mgs./ft.$^2$ of silver and about 50 mgs./ft.$^2$ of gelatin; and (9) A lamina containing 4'-methylphenyl hydroquinone dispersed in gelatin and coated at a coverage of about 10 mgs./ft.$^2$ of 4'-methylphenyl hydroquinone and about 30 mgs./ft.$^2$ of gelatin.

Then a transparent polyethylene terephthalate film base may be coated, in succession, with the following illustrative laminae:

(1) The partial butyl ester of polyethylene/maleic anhydride copolymer prepared by refluxing, for 14 hours, 300 grams of high viscosity poly-(ethylene/maleic anhydride, 140 grams of n-butyl alcohol and 1 cc. of 85% phosphoric acid to provide a polymeric acid layer approximately 0.75 mil thick;

(2) A solution of hydroxypropyl cellulose in water to provide a polymeric spacer layer approximately 0.075 mil thick;

(3) A 2:1 mixture, by weight, of polyvinyl alcohol and poly-4-vinylpyridine, at a coverage of approximately 600 mgs./ft.$^2$, to provide a polymeric image-receiving layer approximately 0.40 mil thick; and (4). Then baking the element at 180° F. for 30 minutes and cooling.

The two components thus prepared may then be secured together in laminate form by means such as a binding tape extending around, in contact with, and over the edges of the components.

A rupturable container comprising an outer layer of lead foil and an inner liner or layer of polyvinyl chloride retaining an aqueous alkaline processing solution comprising:

Water: 100 cc.
Potassium hydroxide: 11.2 grams
Hydroxyethyl cellulose (high viscosity) [commercially available from Hercules Powder Co., Wilmington, Del., under the trade name Natrasol 250]: 3.4 grams
N-benzyl-α-picolinium bromide: 1.5 grams
Benzotriazole: 1.0 gram
Titanium dioxide: 40.0 grams was then secured to the laminate near the leading edge thereof by tapes in a position such that upon application of compressive pressure to the container, its contents will be distributed between the 4'-methylphenyl hydroquinone containing lamina and the polymeric image-receiving lamina.

Following exposure of the photosensitive laminate to radiation incident on the transparent support layer and processed, in the absence of actinic radiation, by moving the exposed film unit between a pair of pressure-applying members to effect rupture of the container and distribution of its contents. During processing, the multicolor dye transfer image formation may be viewed through the transparent film base and such image formation is found to be substantially completed and exhibiting the required color brilliance, hues, saturation and isolation, within a period of approximately ninety seconds.

Although the dimensionally stable support layers comprising the outer layers of the finished product or barriers between the image-containing layer and the atmosphere, may be formed of a variety of conventional opaque and transparent rigid or flexible sheet or film materials, for example, glass, paper, and polymeric films of both synthetic types and those derived from naturally occurring products, it has been discovered that a generally flat, undistorted and dimensionally stable, yet flexible, laminated product can be achieved according to the present invention when the outer support layers comprise polymeric films formed of materials that exhibit low water absorption and low water transmission rates. Such materials generally show very little tendency to swell or become deformed in the presence of water and particularly, water in contact with only one side of the film or layer. Suitable materials include alkaline solution impermeable materials such as vinyl chloride polymers; polyesters such as polymeric films derived from ethylene glycol terephthalic acid, for example, polyethylene terephthalate; polycarbonates; phenylene oxide polymers; acrylics; polyethylene and polypropylene.

It should be recognized that the foregoing compilation of suitable film base materials is exemplary and does not exhaust the list of materials available and suited for the described purpose; and that other materials having superior water absorption qualities are known and available and may be ideally suited for use as the opaque support layer although their optical qualities may not permit their use as the transparent film base through which exposure is made and the image is viewed. Accordingly, the invention contemplates that the symmetrical barriers between the water-containing, image-containing layer and the atmosphere may comprise support layers of different materials that are substantially identical insofar as their physical properties that effect dimensional stability in the presence of moisture are concerned; so that an image-containing layer bounded by layers of such chemically dissimilar, yet physically similar materials, can be considered to be symmetrically disposed with respect to the surrounding atmosphere and dimensional changes, i.e., distortion, do not occur due to variations in the moisture content of or the distribution of moisture within the product.

Although the preceding description of the invention has been couched in terms of the preferred photosensitive component construction wherein at least two selectively sensitized photosensitive strata are in contiguous coplanar relationship and, specifically, in terms of the preferred tri-pack type structure comprising a red-sensitive silver halide emulsion stratum, a green-sensitive silver halide emulsion stratum and a blue-sensitive silver halide emulsion stratum having associated therewith, respectively, a cyan dye developer, a magenta dye developer and a yellow dye developer, the photosensitive component of the film unit may comprise at least two sets of selectively sensitized minute photosensitive elements arranged in the form of a photosensitive screen wherein each of the minute photosensitive elements has associated therewith, for example, an appropriate dye developer in or behind its respective silver halide emulsion portion. In general, a suitable photosensitive screen will comprise minute red-sensitized emulsion elements, minute green-sensitized emulsion elements and minute blue-sensitized emulsion elements arranged in side-by-side relationship in a screen pattern and having associated therewith, respectively, a cyan, a magenta and a yellow dye developer.

The present invention also includes the employment of a black dye developer and the use of a mixture of dye developers adapted to provide a black and white transfer image, for example, the employment of dye developers of the three subtractive colors in an appropriate mixture in which the quantities of the dye developers are proportioned such that the colors combine to provide black.

Where in the specification, the expression "positive image" has been used, this expression should not be interpreted in a restrictive sense since it is used primarily for purposes of illustration, in that it defines the image produced on the image-carrying lamina as being reversed, in the positive-negative sense, with respect to the image in the photosensitive emulsion laminae. As an example of an alternative meaning for "positive image," assume that the photosensitive element is exposed to actinic light through a negative transparency. In this case, the latent image in the photosensitive emulsion layers will be a positive and the dye image produced on the image-carrying lamina will be a negative. The expression "positive image" is intended to cover such an image produced on the image-carrying lamina.

It will be recognized that, by reason of the film unit's structural parameters, the transfer image formed upon direct exposure of the film unit to a selected subject and processing, will be a geometrically reversed image of the subject. Accordingly, to provide transfer image formation geometrically nonreversed, exposure of the film unit should be accomplished through an image reversing optical system including, for example, a mirror.

It will be appreciated that the image-containing laminated product of the invention preferably constitutes a finished, positive, full color, photographic reflection print and that such a print should be as thin as possible consistent with the requisite minimum rigidity, as well as attractive and dimensionally stable, while protectively enclosing a chemically stable, high quality, visible image. The problem of dimensional stability becomes increasingly acute as the thickness of the film base materials is reduced making it more important that the strata or laminae comprsing the moist, image-containing layer function as a single and essentially homogenous unit, this being achieved by providing symmetric barriers between the atmosphere and the moist, image-containing layer, the said barriers being formed of materials characterized by relatively little water absorption. Symmetry, in this latter sense, is considered to mean that the barriers between the image-containing layer and the surrounding atmosphere are essentially the same insofar as moisture is concerned, and that these barriers react and behave in essentially the same manner in response to and in the presence of moisture.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. A laminated photographic product including a transfer image comprising, in combination:
    two dimensionally stable support layers, at least one of which is transparent; and
    an image-containing layer sandwiched between said support layers, the physical responses of said support layers to the presence of moisture in said image-containing layer being substantially the same;
    said image-containing layer comprising a plurality of laminae including in sequence a first lamina comprising a silver halide emulsion and containing an image formed by reduction of exposed silver halide, an intermediate lamina comprising a polymeric film-forming material and an opacifying agent and an image-receptive lamina located closest said transparent support layer and containing a transfer image formed by diffusion of dye image-providing materials from said first lamina through said intermediate lamina to said image-receptive lamina.

2. A photographic product as defined in claim 1 wherein said image-containing layer is formed by a viscous aqueous liquid including said film-forming material and said opacifying agent distributed in a layer between said first lamina and said image-receptive lamina.

3. A photographic product as defined in claim 2 wherein said laminae comprising said image-containing layer are hydrophilic and said support layers are relatively impermeable to water vapor.

4. A photographic product as defined in claim 1 wherein said support layers are formed of the same polymeric material and have substantially the same physical characteristics.

5. A photographic product as defined in claim 4 wherein said support layers are relatively impermeable to water vapor.

6. A photographic product as defined in claim 4 wherein said support layers are formed of polyesters derived from ethylene glycol terephthalic acid.

7. A laminated photographic product including a dye transfer image comprising, in combination:
    an image-containing layer comprising a plurality of laminae containing moisture and including, in sequence, a first lamina comprising a silver halide emulsion and containing an image formed by reduction of exposed silver halide, an intermediate lamina comprising a polymeric film-forming material and an opacifying agent and an image-receptive lamina containing a dye transfer image formed by diffusion of a dye image-providing material from said first lamina through said intermediate lamina to said image-receptive lamina; and
    two dimensionally stable support layers, at least one of which is transparent, laminated with the opposite faces of said image-containing layer with said transparent support layer being located closest said image-receptive lamina;
    said support layers being relatively impermeable to moisture and constituting barriers between said image-containing layer and the surrounding atmosphere having physical responses to moisture in said image-containing layers that are substantially the same.

8. A photographic product as defined in claim 7 wherein said laminae comprising said image-containing layer are hydrophilic and contain water and said support layers are relatively impermeable to water vapor.

References Cited

UNITED STATES PATENTS

| | | | |
|---|---|---|---|
| 1,929,254 | 11/1930 | Narath | 96—84 |
| 2,143,791 | 1/1939 | Nadeau | 96—84X |
| 3,091,535 | 5/1963 | Milner | 96—84 |
| 3,222,178 | 12/1965 | Nadeau et al. | 96—69 |
| 3,332,792 | 7/1967 | Mackey | 96—84X |
| 3,340,062 | 9/1967 | Hunter et al. | 96—84 |

NORMAN G. TORCHIN, Primary Examiner

A. T. SURO PICO, Assistant Examiner

U.S. Cl. X.R.

96—29